May 1, 1945.  L. BLOCH  2,374,642
WASTE AND OVERFLOW FITTING
Filed Feb. 7, 1944
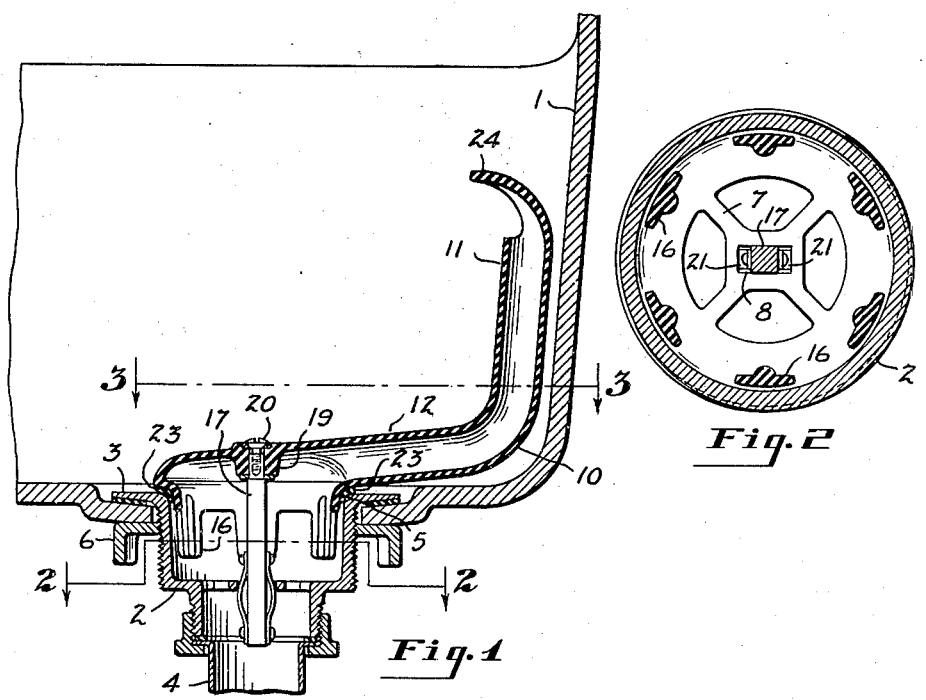
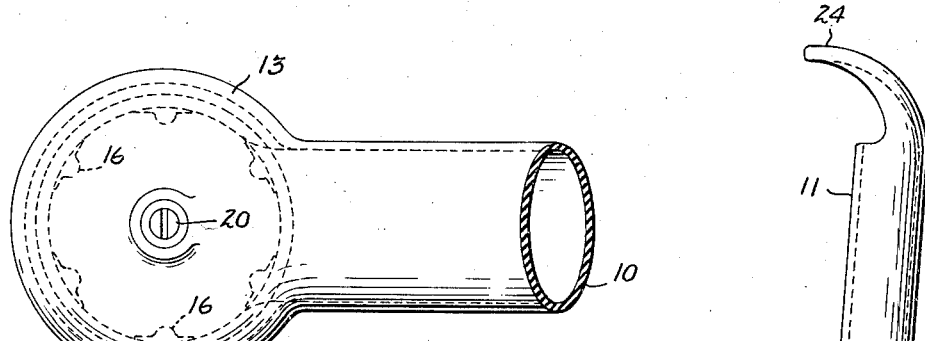
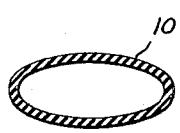
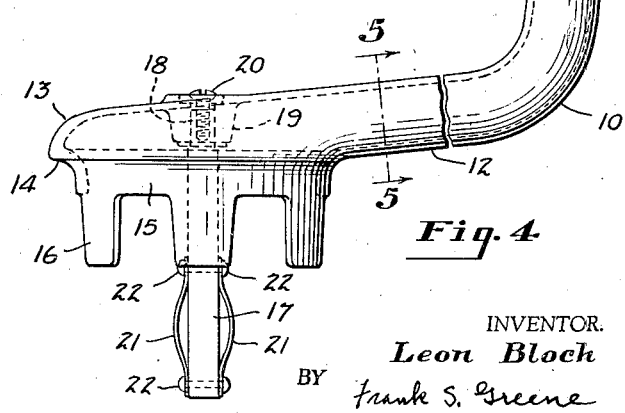
INVENTOR.
Leon Bloch
BY Frank S. Greene
ATTORNEY Patented May 1, 1945

2,374,642

UNITED STATES PATENT OFFICE 2,374,642

WASTE AND OVERFLOW FITTING

Leon Bloch, Cleveland, Ohio

Application February 7, 1944, Serial No. 521,390

3 Claims. (Cl. 4—206)

The present invention relates to a waste and overflow fitting for use in a liquid receptacle having a drain outlet in the bottom thereof and particularly to a fitting suitable for use in kitchen sinks.

Important objects of the present invention are to provide a simple and inexpensive fitting that can readily be applied to the drain outlet of a receptacle such as a kitchen sink and to provide a fitting in the form of a combined valve and overflow tube that can be moved in the drain outlet to a position to close the same when it is desired to retain liquid in the receptacle and which can be adjusted in the outlet to an open position where it permits drainage of liquid from the receptacle.

It is also an object of the invention to provide a fitting which is so mounted in the drain outlet that it can be detached from the receptacle by simply lifting it out of the drain outlet.

With the above and other objects in view the invention may be said to comprise the fitting as illustrated in the accompanying drawing hereinafter described and particularly set forth in the appended claims, together with such variations and modifications thereof as will be apparent to one skilled in the art to which the invention pertains.

Reference should be had to the accompanying drawing forming part of the specification in which:

Fig. 1 is a fragmentary vertical section showing the fitting of the present invention mounted in the drain outlet of a kitchen sink;

Fig. 2 is a section taken on the line indicated at 2—2 in Fig. 1;

Fig. 3 is a section taken on the line indicated at 3—3 in Fig. 1;

Fig. 4 is a side elevation of the fitting; and

Fig. 5 is a section taken on the line indicated at 5—5 in Fig. 4.

The device of the present invention is a fitting adapted to be mounted in the drain outlet of a kitchen sink and which may be moved from a closed position in which it seals the drain outlet so that liquid may be retained in the sink to an open position where it permits water to drain from the sink, the fitting being so constructed as to provide an overflow passage which prevents the liquid from rising beyond a predetermined level in the sink.

In the accompanying drawing the invention is shown applied to a kitchen sink 1 of conventional construction provided with an opening in its bottom through which a drain outlet is provided by means of a coupling member 2 having a flange 3 at its upper end that rests upon the bottom of the sink around the opening and having its lower end coupled to a suitable drain pipe 4. The coupling member 4 provides a drain outlet and has a shoulder 5 at its upper end upon which a drain closing valve may be seated, the coupling member being attached to the sink bottom by suitable means such as a clamping nut 6.

Within the drain outlet below the top thereof there is provided a suitable guide member 7 in the form of a spider provided with a rectangular opening 8 in the central portion thereof which is adapted to receive the stem of a valve mounted in the outlet.

The fitting of the present invention has a body portion in the form of a combined valve and overflow tube 10. The tube 10 is L-shaped having an upright portion 11 that is adapted to be positioned alongside a side wall of the sink 1 and a substantially horizontal portion 12 that is adapted to overlie the sink bottom between the drain outlet and the side wall. The upright portion 11 of the tube is open at its upper end so that water may overflow from the sink into the tube and the horizontal portion 12 of the tube has an enlarged end portion 13 that overlies the drain outlet and that has an opening on its underside through which water overflowing through the tube 10 may pass into the drain outlet. The underside of the portion 13 is shaped to provide a valve adapted to seat in the drain outlet being provided with an annular shoulder 14 adapted to overlie the shoulder 5 of the drain outlet and having a depending circular strainer flange 15 that is adapted to enter the tubular coupling member 2. The strainer flange 15 is constructed to provide restricted passages for water flowing from the sink when the fitting is lifted to raise the shoulder 14 off its seat. As herein shown, the strainer flange is provided with depending strainer fingers 16 that are regularly spaced throughout the circumference of the outlet.

For maintaining the fitting in proper position in the sink and for guiding the same during its adjustment from outlet closing to draining position, the fitting is provided with a vertical stem 17 which is attached to the tube centrally of the valve portion. The stem 17 has a reduced upper end portion 18 which is received in a boss 19 formed integrally with the top wall of the tube and is secured in place by means of a screw 20 threaded into the upper end of the reduced portion 18. The stem 17 is of rectangular cross section and of a thickness to fit between the side walls of the elongated guide opening of the member 7 so that stem and the tube 10, which is rigidly attached thereto, are held against turning movements in the drain outlet. In order to yieldingly hold the fitting in different positions of vertical adjustment, two arched leaf springs 22 are secured by suitable means such as rivets 22 to opposite side faces of the stem 17 and these springs yieldably bear against the member 7 at opposite ends of the guide opening 8 so as to yieldably hold the fitting in different positions of vertical adjustment to which it may be moved.

When the fitting is seated on the outlet as shown in Fig. 1, the outlet is sealed and water may be introduced into the sink until the level thereof reaches the upper end of the upright portion 11 of the tube whereupon the water will overflow through the tube into the drain outlet. The fitting thus prevents the water level from rising above a predetermined point and prevents overflow from the sink such as may be caused by leaving the faucet open when the sink outlet is closed by an ordinary valve.

The springs 21 are of a length sufficient to maintain frictional engagement with the guide member 7 and hold the fitting in a raised position in which the shoulder 14 is lifted off the outlet seat far enough to permit water to drain from the sink. When desired the fitting may be removed from the sink by simply lifting it out of the drain outlet there being no attachment to the outlet except through the frictional engagement of the springs 21 with the guide member 7.

If desired a suitable sealing washer 23 may be mounted on the valve portion of the fitting around the flange 15 and beneath the shoulder 14.

The upper end of the upright portion 11 of the tube may be provided with a curved finger grip portion 24 which extends above the upper end of the tube and above the liquid level so that it can be grasped to lift the fitting when desired. The curved finger grip portion 24 is preferably formed integral with the portion of the tube wall which is adjacent the side wall of the sink and is curved inwardly over the open top of the tube.

It is desirable that the fitting be so formed as to closely overlie the bottom and side wall of the sink so as not to form an obstruction which would be inconvenient for operations such as washing dishes in the sink. The tube is therefore formed of oblong cross section having its wide dimension parallel with the bottom and side of the sink so that the fitting is confined to a space closely adjacent the bottom and side wall of the sink and only a small portion of the space within the sink is obstructed by the fixture.

It will be apparent that the device of the present invention provides a very simple, inexpensive and efficient waste and overflow fitting that is adapted to be put into use by simply inserting it into the outlet of a kitchen sink and that may be instantly detached from the sink by simply lifting it out of the sink outlet.

It is to be understood that variations and modifications of the specific device herein shown and described for purposes of illustration, may be made without departing from the spirit of the invention.

What I claim is:

1. A combined overflow and waste valve fitting for mounting in a sink drain outlet formed to receive a valve and having a valve stem guide and a tubular portion above said guide, said fitting comprising an L-shaped overflow tube having a substantially upright portion adapted to be positioned alongside a side wall of the sink and a substantially horizontal portion adapted to overlie the sink bottom between the drain outlet and side wall, said tube being of oblong cross section elongated in planes parallel to the bottom and side wall and open at its upper end, said horizontal portion having a downwardly facing opening, a valve portion surrounding the opening adapted to seal the drain outlet and a strainer flange adapted to be received in said tubular portion of the outlet, a stem attached to said tube extending downwardly through the opening and slidably and non-rotatably engaging said stem guide, and means interposed between said stem and stem guide for yieldably holding said fitting in different positions of vertical adjustment.

2. A combined overflow and waste valve fitting for mounting in a sink drain outlet formed to receive a valve and having a valve stem guide, said fitting comprising an L-shaped overflow tube having a substantially upright portion adapted to be positioned alongside a side wall of the sink and a substantially horizontal portion adapted to overlie the sink bottom between the drain outlet and side wall, said tube being of oblong cross section elongated in planes parallel to the bottom and side wall and open at its upper end, said horizontal portion having a downwardly facing opening and a valve portion surrounding the opening adapted to seal the drain outlet, said valve portion including an annular depending strainer flange adapted to enter the drain outlet, and means for holding said fitting against turning movements and for yieldably holding the same in different positions of vertical adjustment comprising a stem attached to said tube extending downwardly through the opening and slidably and non-rotatably engaging said stem guide, and means attached to said stem and engageable with said guide for yieldably holding the fitting in different positions of vertical adjustment.

3. A combined overflow and waste valve fitting for mounting in a sink drain outlet formed to receive a valve and having a valve stem guide provided with an elongated valve stem receiving opening, said fitting comprising an L-shaped overflow tube of oblong cross section with an upright portion and a horizontal portion, said upright portion being open at its upper end and having an integral curved finger grip extension, said horizontal portion having a downwardly facing opening and a valve portion surrounding the opening adapted to seal the drain outlet, and means for holding the fitting against turning movements and for yieldably holding the same in adjusted vertical positions comprising a stem attached to the tube and extending downwardly through said opening, said stem being of a thickness to fit between the sides of said elongated opening of the guide member and being held against turning by the guide member, and a leaf spring attached to said stem and engageable with the guide member to hold the fitting in different positions of vertical adjustment.

LEON BLOCH.